United States Patent
Park et al.

(10) Patent No.: US 9,118,370 B2
(45) Date of Patent: Aug. 25, 2015

(54) METHOD AND APPARATUS FOR IMPULSIVE NOISE MITIGATION USING ADAPTIVE BLANKER BASED ON BPSK MODULATION SYSTEM

(71) Applicants: Electronics and Telecommunications Research Institute, Daejeon (KR); Industry-University Cooperation Foundation Hanyang University, Ansan-si Gyeonggi-do (KR)

(72) Inventors: Seung Keun Park, Daejeon (KR); Sang Bong Jeon, Daejeon (KR); Su Na Choi, Daejeon (KR); Haewoon Nam, Ansan-si (KR); Hyungkook Oh, Ansan-si (KR)

(73) Assignees: Electronics and Telecommunications Research Institute, Daejeon (KR); INDUSTRY-UNIVERSITY COOPERATION FOUNDATION HANYANG UNIVERSITY, Gyeonggi-do (KR)

( * ) Notice: Subject to any disclaimer, the term of this patent is extended or adjusted under 35 U.S.C. 154(b) by 0 days.

(21) Appl. No.: 14/255,319

(22) Filed: Apr. 17, 2014

(65) Prior Publication Data

US 2014/0314185 A1 Oct. 23, 2014

(30) Foreign Application Priority Data

Apr. 17, 2013 (KR) .................. 10-2013-0042324
Dec. 18, 2013 (KR) .................. 10-2013-0157790

(51) Int. Cl.
| | |
|---|---|
| *H03D 1/04* | (2006.01) |
| *H03D 1/06* | (2006.01) |
| *H03K 5/01* | (2006.01) |
| *H04B 1/04* | (2006.01) |

(52) U.S. Cl.
CPC .................. *H04B 1/0475* (2013.01)

(58) Field of Classification Search
CPC ............... G10L 21/0208; H03G 3/345
See application file for complete search history.

(56) References Cited

U.S. PATENT DOCUMENTS

| | | | |
|---|---|---|---|
| 2010/0014681 A1* | 1/2010 | Sugiyama .................. | 381/56 |
| 2011/0151790 A1 | 6/2011 | Khandekar et al. | |
| 2011/0158360 A1* | 6/2011 | Pun et al. .................. | 375/346 |
| 2013/0070821 A1 | 3/2013 | Lai et al. | |

FOREIGN PATENT DOCUMENTS

KR 1020110080890 A 7/2011

OTHER PUBLICATIONS

Khodr A. Saaifan et al., "Decision Boundary Evaluation of Optimum and Suboptimum Detectors in Class-A Interference," IEEE Transactions on Communications, Jan. 2013, pp. 197-205, vol. 61, No. 1, IEEE.

\* cited by examiner

*Primary Examiner* — Sam K Ahn
*Assistant Examiner* — Fabricio R Murillo Garcia
(74) *Attorney, Agent, or Firm* — William Park & Associates Ltd.

(57) ABSTRACT

A method for impulsive noise mitigation using an adaptive blanker based on BPSK modulation system includes estimating narrowband Middleton parameters of impulsive noise from signals received for a fixed time period; calculating a threshold using the estimated narrowband Middleton parameters; operating the first blanker to suppress impulsive noise from the signal received at a given point of time through the comparison of the SNR value of the received signal and the threshold. Further, the method includes operating the second blanker to suppress impulsive noise from the received signal through the comparison of the summation of the threshold and the SNR value with an absolute value of the received signal, when the SNR value is above the threshold.

8 Claims, 3 Drawing Sheets

METHOD AND APPARATUS FOR IMPULSIVE NOISE MITIGATION USING ADAPTIVE BLANKER BASED ON BPSK MODULATION SYSTEM

CROSS-REFERENCE TO RELATED APPLICATIONS

The present invention claims priority of Korean Patent Application No. 10-2013-0042324, filed on Apr. 17, 2013, and Korean Patent Application No. 10-2013-00157790, filed on Dec. 18, 2013, which are incorporated herein by references.

FIELD OF THE INVENTION

The present invention relates to a BPSK (Binary Phase Shift Keying) modulation system, and more particular, to an apparatus and method for impulsive noise mitigation using an adaptive blanker based on a BPSK modulation system that is capable of suppressing the impulsive noise by adaptively utilizing two blankers on a basis of a SNR (signal-to-noise ratio) value and a threshold value.

BACKGROUND OF THE INVENTION

In recent years, radio frequency interference has been greatly increased due to an explosion of the number of electronic devices, which may cause impulsive noise to wireless devices. In order to mitigate the performance deterioration of a wireless device due to the impulsive noise, there has been a proposed nonlinear block which allows increasing an output value in case of Gaussian noise, whereas allows reducing the output value in case of large impulsive noise.

How to design the nonlinear block includes a method for determining a weight using a blanker. In the related art, there is a disclosed method to reduce an influence of impulse-like noise by using respective weights in an OFDM system.

Further, in the existing method of designing the nonlinear block as described above, a threshold value of a blanker is expressed in an equation to determine the respective weights. However, the expressed equation is complex and the BER (Bit Error Rate) performance degradation is significant in a high SNR region.

SUMMARY OF THE INVENTION

In view of the above, the present invention provides an apparatus and method for impulsive noise mitigation using an adaptive blanker based on a BPSK modulation system that is capable of improving the BER (Bit Error Rate) performance deterioration in high SNR region due to an impulsive noise using a nonlinear block having two-blanker structure, by utilizing parameters A and $\Gamma$ of the narrowband Middleton model that are calculated from signals received for a fixed time period in advance and a signal S measured by a SNR meter. However, the technical subject of the present invention is not limited to the foregoing technical subject, and there may be other technical subjects.

In accordance with the first aspect of the present invention, there is a provided method for impulsive noise mitigation using an adaptive blanker based on BPSK modulation system. The method includes estimating narrowband Middleton parameters of impulsive noise from signals measured for a fixed time period; calculating a threshold using the estimated narrowband Middleton parameters; operating the first blanker to suppress impulsive noise from the incoming signal when the SNR value measured by an SNR meter is below the threshold; and operating the second blanker to suppress impulsive noise from the received signal when the SNR value is above the threshold.

Further, the comparison described above may include calculating the threshold using the following equation:

$$z = \sqrt{\frac{\log\left(\frac{1}{A}\sqrt{\frac{\sigma_1^2}{\sigma_0^2}}\right)}{\frac{1}{2\sigma_0^2} - \frac{1}{2\sigma_1^2}}} \text{ where}$$

$$\sigma_m^2 = \frac{\frac{m}{A} + \Gamma}{1 + \Gamma},$$

m as a value of 0 or 1, and A and $\Gamma$ represent narrowband Middleton parameters.

Further, In the mode of operation, the first blanker outputs a value of '0' when the absolute value of the received signal is greater than the threshold, otherwise outputs the received signal.

On the other hand, the second blanker outputs a positive number close to zero when the summation of the threshold and the signal value is less than the absolute value of the received signal, otherwise outputs the received signal.

In accordance with the second aspect of the present invention, there is an apparatus provided for impulsive noise mitigation using an adaptive blanker based on BPSK modulation system. The apparatus includes a parameter estimator configured to estimate narrowband Middleton parameters of impulsive noise from signals received for a fixed time period; a controller configured to calculate the threshold using the estimated narrowband Middleton parameters and produce a switching signal through the comparison of a SNR value which is measured based on the received signals in advance with the threshold; the first blanker configured to suppress impulsive noise from a signal received at a given point of time through the comparison of an absolute value of the received signal value with the threshold; the second blanker configured to suppress impulsive noise from the received signal through the comparison of the absolute value of the received signal with the summation of the threshold and the SNR value; and a switching unit configured to selectively apply the received signal to either the first blanker or the second blanker by performing an switching action in accordance with the switching signal.

Further, the threshold may be calculated by the following equation:

$$z = \sqrt{\frac{\log\left(\frac{1}{A}\sqrt{\frac{\sigma_1^2}{\sigma_0^2}}\right)}{\frac{1}{2\sigma_0^2} - \frac{1}{2\sigma_1^2}}} \text{ where}$$

$$\sigma_m^2 = \frac{\frac{m}{A} + \Gamma}{1 + \Gamma},$$

m has a value of 0 or 1, and A and $\Gamma$ represent narrowband Middleton parameters.

Further, the first blanker may output a value of '0' when the absolute value of the received signal is greater than the threshold, otherwise may output the received signal.

Further, the second blanker may output a positive number close to zero when the summation of the threshold and the SNR value is less than the absolute value of the received signal, otherwise may output the received signal.

In accordance with the solutions to the aforementioned subject of the present invention, it is shown to achieve a lower BER by help of the nonlinear block based on an adaptive blanker and also obtain a good BER performance even in a low SNR region, as opposed to the BER measured when using an existing receiver in an impulse noise environment.

BRIEF DESCRIPTION OF THE DRAWINGS

The above and other objects and features of the present invention will become apparent from the following description of the embodiments given in conjunction with the accompanying drawings, in which.

DETAILED DESCRIPTION OF THE EMBODIMENTS

Figure 1:
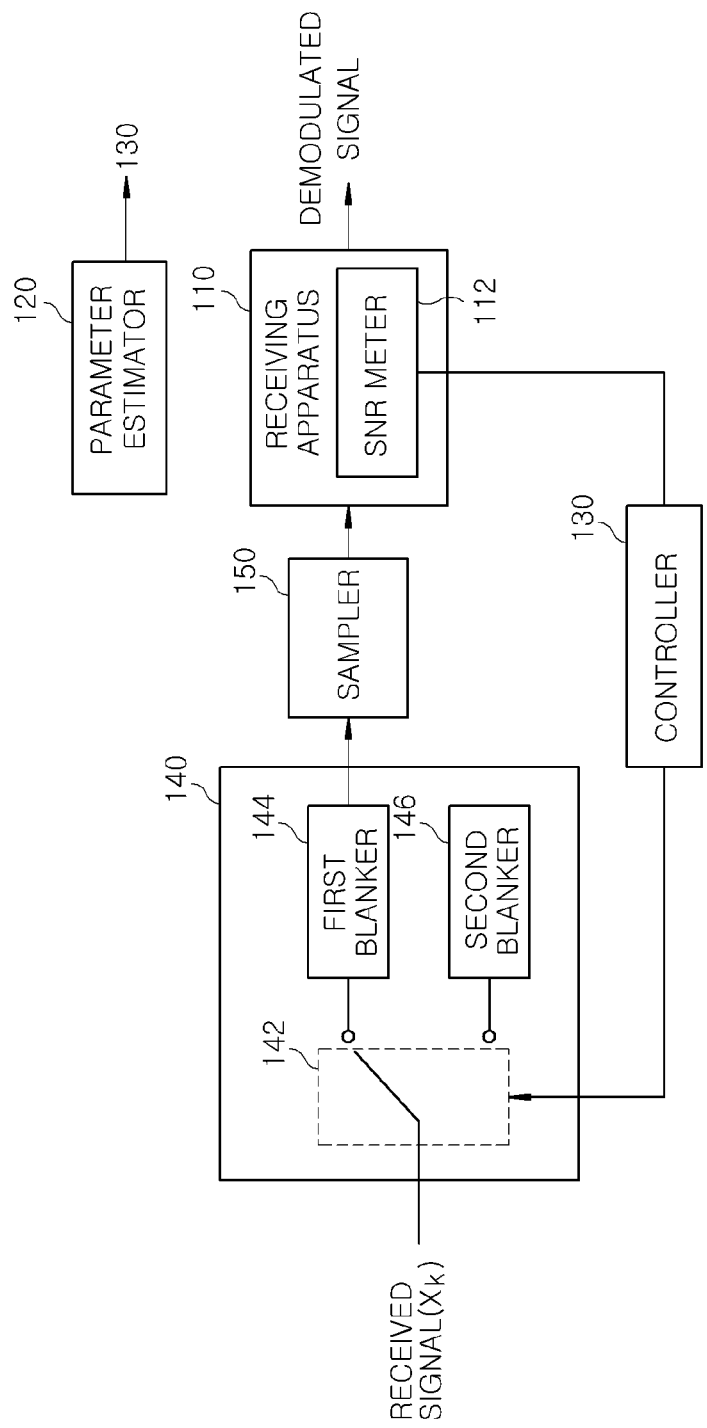
FIG. 1 is a block diagram of a BPSK modulation system to which an apparatus for impulsive noise mitigation is applied in accordance with an embodiment of the present invention.

Advantages and features of the invention and methods of accomplishing the same may be understood more readily by reference to the following detailed description of embodiments and the accompanying drawings. The invention may, however, be embodied in many different forms and should not be construed as being limited to the embodiments set forth herein. Rather, these embodiments are provided so that this disclosure will be thorough and complete and will fully convey the concept of the invention to those skilled in the art, and the invention will only be defined by the appended claims. Like reference numerals refer to like elements throughout the specification.

In the following description of the present invention, if the detailed description of the already known structure and operation may confuse the subject matter of the present invention, the detailed description thereof will be omitted. The following terms are terminologies defined by considering functions in the embodiments of the present invention and may be changed operators intend for the invention and practice. Hence, the terms need to be defined throughout the description of the present invention.

Hereinafter, the embodiments of the present invention will be described in detail with reference to the accompanying drawings.

FIG. 1 is a block diagram of a BPSK modulation system to which an apparatus for impulsive noise mitigation is applied in accordance with the embodiment of the present invention.

As illustrated in the drawing, the BPSK modulation system includes a receiving apparatus 110 having an SNR meter 112, a parameter estimator 120, a controller 130, a impulsive noise processor 140, and a sampler 150.

The receiving apparatus 110 may extract a SNR value (hereinafter, referred to as a signal value) through the SNR meter 112 from received signals that are measured in advance.

In addition, the receiving apparatus 110 may demodulate the signal outputted through the sampler 150 to yield a demodulated signal.

The parameter estimator 120 may estimate a narrowband Middleton parameters of an impulse noise from the received signals that are measured in advance. The signal value outputted from the SNR meter 112 of the receiving apparatus 110 and the estimated narrowband Middleton parameters from the parameter estimator 120 are provided to the controller 130.

The controller 130 may calculate a threshold z by applying the narrowband Middleton parameters to the following equation 1. Also, the controller 130 may compare between the calculated threshold and the signal value to produce a switching signal which will be provided to the impulsive noise processor 140.

$$z = \sqrt{\frac{\log\left(\frac{1}{A}\sqrt{\frac{\sigma_1^2}{\sigma_0^2}}\right)}{\frac{1}{2\sigma_0^2} - \frac{1}{2\sigma_1^2}}}$$ [Equation 1]

In the above Equation 1, $$\sigma_m^2 = \frac{\frac{m}{A} + \Gamma}{1 + \Gamma}$$

and m has a value of 0 or 1. In addition, A and $\Gamma$ represent narrowband Middleton parameters.

The controller 130 may provide a first switching signal which allows a received signal which is provided at a certain point of time to direct toward a first blanker 144 to a switching unit 142 if the signal value is below the threshold z. Further, the controller 130 provides a second switching signal which allows the received signal to direct toward a second blanker 146 if the signal value is above the threshold z.

The switching unit 142 may operate in accordance with the first or the second switching signal to apply the received signal to the first blanker 144 or the second blanker the second blanker 146, respectively.

The first blanker 144 may operate based on the following equation 2, that is, may remove the noise from a received signal $x_k$ through the comparison between an absolute magnitude value of the received signal $x_k$ and the threshold z.

$$\alpha(x_k) = \begin{matrix} 0, & x_k > z \\ x_k, & |x_k| \le z \\ 0, & x_k < -z \end{matrix}$$ [Equation 2]

Explaining the operation of the first blanker 144 on a basis of the Equation 2, the first blanker 144 outputs '0' when the absolute value of the received signal $x_k$ is less than or greater than the threshold z, otherwise the first blanker 144 outputs the received signal $x_k$.

Meanwhile, the second blanker 146 may operate based on the following equation 3, that is, may remove the noise from the received signal $x_k$ through the comparison of the summation of the threshold z and the signal value S with an absolute value of the received signal $x_k$.

$$\beta(x_k) = \begin{cases} \varepsilon, & x_k > S+z \\ x_k, & |x_k| \leq S+z \\ -\varepsilon, & x_k < -(S+z) \end{cases} \quad \text{[Equation 3]}$$

In the Equation 3, $\epsilon$ is a very small positive number close to zero.

Explaining the operation of the second blanker 146 on a basis of the Equation 3, the second blanker 146 outputs $\epsilon$ which is a very small positive number close to zero when the summation of the threshold z and the signal value S is greater than or less than the absolute value of the received signal $x_k$, otherwise the second blanker 146 outputs the received signal $x_k$.

The signal outputted from the first blanker 144 or the second blanker 146 may be inputted to the sampler 150.

The sampler 150 oversamples the signal from the first blanker 144 or the second blanker 146 at N-times the sampling of symbols.

The receiving apparatus 110 may demodulate the oversampled signal to produce a demodulated signal.

The operation of the BPSK modulation system having the foregoing configuration will be described with reference to FIG. 2 as follows.

Figure 2:
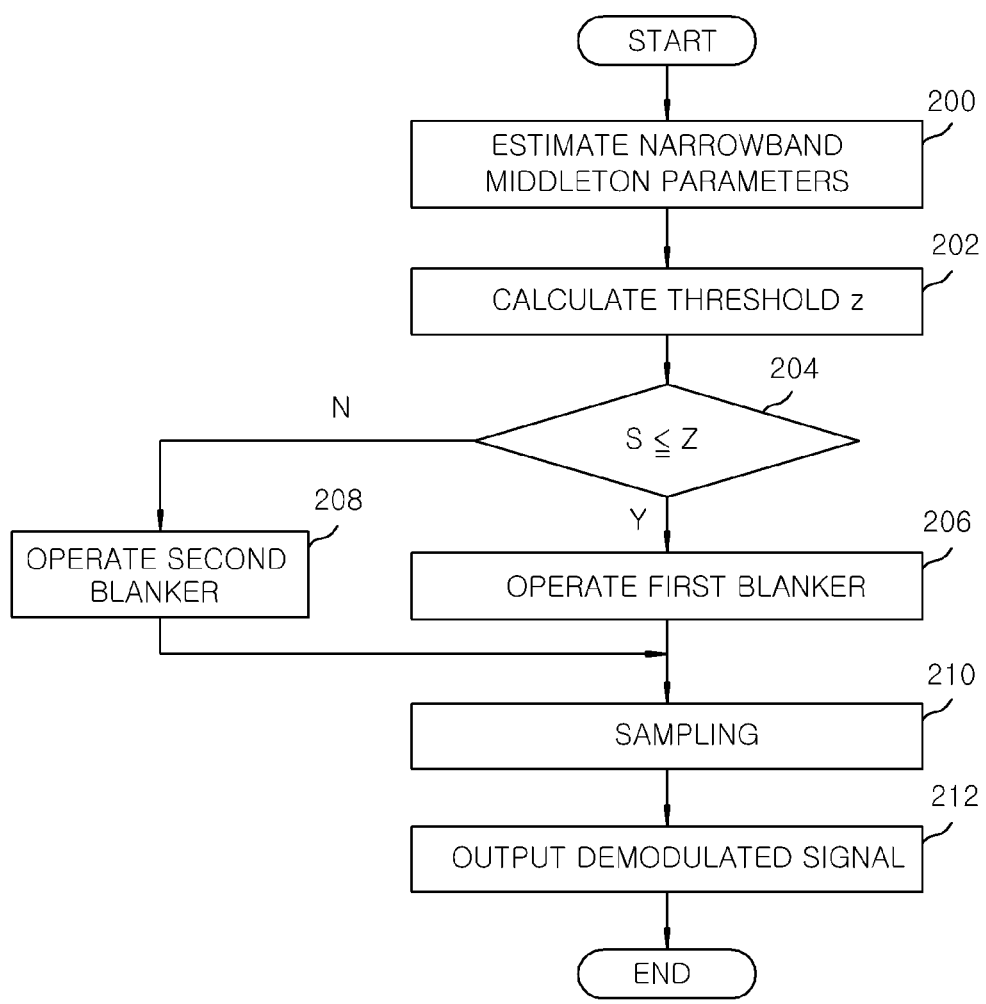
FIG. 2 illustrates a flowchart illustrating a method of processing a received signal using an apparatus for impulsive noise mitigation in accordance with an embodiment of the present invention.

FIG. 2 illustrates a flowchart illustrating a method of processing a received signal using the apparatus for impulsive noise mitigation in accordance with an embodiment of the present invention.

The method of the embodiment begins with Block 200 where the estimates of narrow Middleton parameters A and Γ of impulse noise are calculated from received signal that is measured in advance. A threshold z is then calculated by substituting the Equation 1 with the calculated estimates A and Γ (Block 202).

Next, the calculated threshold z is compared with the signal value S obtained from the SNR meter 112 of the receiving apparatus 110 (Block 204). When the received signal $x_k$ is provided at a point of time k, if the signal value S is less than or equal to the threshold z, the first blanker 144 is allowed to operate as expressed in the Equation 2 (Block 206). However, if the signal value S is greater than the calculated threshold z, the second blanker 146 is allowed to perform the function as expressed in the Equation 3 (Block 208). The sampler 150 samples the signal inputted from either the first blanker 144 or the second blanker 146 at an oversampling N-times the sampling of symbols to produce a sampled signal in which the sampled signals from either the first blanker 144 or the second blanker 146 are combined every a point of time k, (Block 210).

The sampled signal from the sampler 150 is then provided to the receiving apparatus 110. The receiving apparatus 110 demodulates the sampled signal from the sampler 150 and outputs a demodulated signal (Block 212). The following operations are the same as those performed in a conventional receiving apparatus, and thus detailed description thereof will be omitted.

As mentioned above, it is noted that the embodiment of the present invention employs an adaptive blanker which selects either of the two blankers in accordance with the comparison result between the signal value S and the threshold z.

Figure 3:
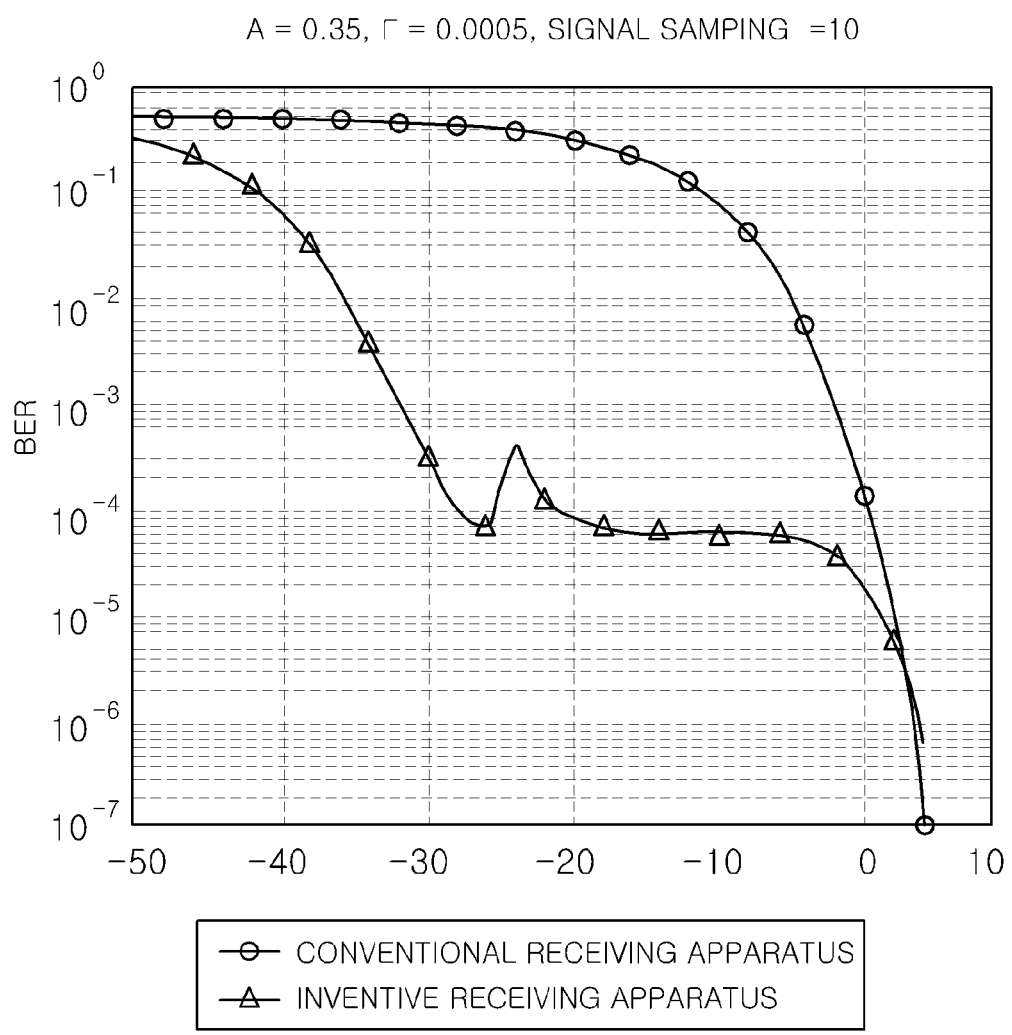
FIG. 3 is a graph showing an experimental result of a BPSK modulation system to which an apparatus for impulsive noise mitigation is applied in accordance with an embodiment of the present invention.

The effect of the embodiment can be observed from a computer simulation of the BER of the BPSK modulation system as follows. By applying A of 0.35, Γ of 0.0005, and N (the number of samplings) of 10, the improvement can be obtained over the prior art. As shown in FIG. 3, it can be known that the BER where the impulsive noise processor 140 based on the adaptive blanker is employed is much lower than the BER where a typical receiving apparatus only is employed in an impulse noise environment. Particularly, the embodiment has a merit that a good BER can be obtained even a SNR lower than 0 dB. The BER of the conventional receiving apparatus is relatively a little lower than that of the present invention when the SNR is greater than 0 dB. However, it is necessary to use the nonlinear block because the impulsive noise causes nonlinear distortion.

Accordingly, in accordance with an embodiment of the present invention, it is possible to lower a BER by help of a nonlinear block based on an adaptive blanker in comparison with an BER measured when using a conventional receiving apparatus only in an impulse noise environment, as well as to obtain a good BER even in a low SNR.

Description of the present invention as mentioned above is intended for illustrative purposes, and it will be understood to those having ordinary skill in the art that this invention can be easily modified into other specific forms without changing the technical idea and the essential characteristics of the present invention. Accordingly, it should be understood that the embodiments described above are exemplary in all respects and not limited thereto. For example, respective components described to be one body may be implemented separately from one another, and likewise components described separately from one another may be implemented in an integrated type.

While the invention has been shown and described with respect to the embodiments, the present invention is not limited thereto. It will be understood by those skilled in the art that various changes and modifications may be made without departing from the scope of the invention as defined in the following claims.

What is claimed is:

1. A method for impulsive noise mitigation using an adaptive blanker based on a Binary Phase Shift Keying (BPSK) modulation system, the method comprising:

estimating narrowband Middleton parameters of impulse noise from signals received for a fixed time period;

calculating, by a controller, a threshold using the estimated narrowband Middleton parameters;

operating, by an impulse noise processor, a first blanker to remove noise from a signal received at a given point of time through the comparison of an absolute value of the received signal and the threshold, when a signal-to-noise ratio (SNR) value measured by an SNR meter is below the threshold; and operating, by the impulse noise processor, a second blanker to remove noise from the received signal through the comparison of the summation of the threshold and the SNR value with an absolute value of the received signal, when the SNR value is above the threshold.

2. The method of claim 1, wherein said calculating includes calculating the threshold using the following equation:

$$z = \sqrt{\frac{\log\left(\frac{1}{A}\sqrt{\frac{\sigma_1^2}{\sigma_0^2}}\right)}{\frac{1}{2\sigma_0^2} - \frac{1}{2\sigma_1^2}}} \quad \text{where}$$

$$\sigma_m^2 = \frac{\frac{m}{A} + \Gamma}{1+\Gamma},$$

m has a value of 0 or 1, and A and $\Gamma$ represent narrowband Middleton parameters.

3. The method of claim 1, wherein said operating a first blanker comprises:
outputting, from the first blanker, a value of '0' when the absolute value of the received signal is greater than the threshold, otherwise outputting the received signal.

4. The method of claim 1, wherein said operating a second blanker comprises:
outputting, from the second blanker, a positive number close to zero when the summation of the threshold and the SNR value is less than the absolute value of the received signal, otherwise outputting the received signal.

5. An apparatus for impulsive noise mitigation using an adaptive blanker based on a Binary Phase Shift Keying (BPSK) modulation system, the apparatus comprising:
a parameter estimator configured to estimate a narrowband Middleton parameters of impulse noise from signals received for a fixed time period;
a controller configured to calculate a threshold using the estimated narrowband Middleton parameters and produce a switching signal through the comparison of a signal-to-noise ratio (SNR) value which is measured based on the received signals in advance with the threshold;
a first blanker configured to remove noise from a signal received at a given point of time through the comparison of an absolute value of the received signal value with the threshold;
a second blanker configured to remove noise from the received signal through the comparison of the absolute value of the received signal with the summation of the threshold and the SNR value; and
a switching unit configured to selectively apply the received signal to either the first blanker or the second blanker by performing a switching action in accordance with the switching signal.

6. The apparatus of claim 5, wherein the threshold is calculated by the following equation:

$$z = \sqrt{\frac{\log\left(\frac{1}{A}\sqrt{\frac{\sigma_1^2}{\sigma_0^2}}\right)}{\frac{1}{2\sigma_0^2} - \frac{1}{2\sigma_1^2}}} \text{ where}$$

$$\sigma_m^2 = \frac{\frac{m}{A} + \Gamma}{1 + \Gamma},$$

m has a value of 0 or 1, and A and $\Gamma$ represent narrowband Middleton parameters.

7. The apparatus of claim 5, wherein the first blanker outputs a value of '0' when the absolute value of the received signal is greater than the threshold, otherwise outputs the received signal.

8. The apparatus of claim 5, wherein the second blanker outputs a positive number close to zero when the summation of the threshold and the SNR value is less than the absolute value of the received signal, otherwise outputs the received signal.

* * * * *